Sept. 24, 1963 J. A. POLLOCK 3,104,724
EARTH WORKING TOOL HAVING A SPECIFIC
TOOL AND STANDARD CONNECTION
Filed Jan. 29, 1962 2 Sheets-Sheet 1

INVENTOR.
JAMES A. POLLOCK
BY John F. Brezina
Atty

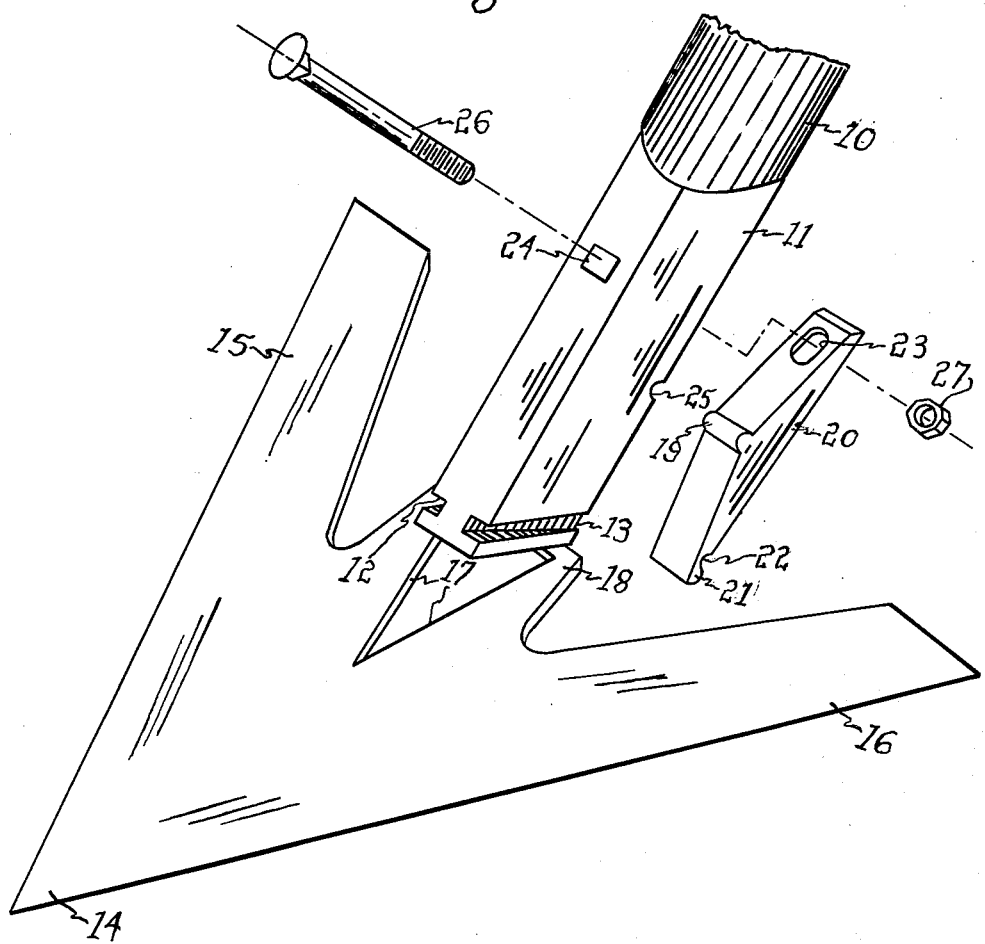

United States Patent Office 3,104,724
Patented Sept. 24, 1963

3,104,724
EARTH WORKING TOOL HAVING A SPECIFIC TOOL AND STANDARD CONNECTION
James A. Pollock, 1303 5th Ave., Albany, Ga.
Filed Jan. 29, 1962, Ser. No. 169,566
2 Claims. (Cl. 172—762)

My invention pertains to novel plow blades and novel means for removably and quickly mounting the same upon novel adjustable standards of plows and cultivators.

It is an important object of my invention to provide adjustable standards for plows and cultivators and novel blades and sweeps and having means for quickly, easily and securely releasably mounting such blades on the standards to which they are connected.

Presently known plows and cultivators, particularly those which are tractor powered, have blades, sweeps and shovels which dig, move and agitate the soil adjacent row crop plants and normally have their shank and connecting socket portions of substantial size and thickness and are secured by cross bolts extending therethrough, such relatively thick sockets and brackets with the end portions of the bolts projecting therefrom presenting a relatively wide mass of metal parts which push and deflect excessive amounts of broken soil and dirt in sidewise transverse directions to thereby cover small plants with soil and consequently cause same to die. This frequently occurs in the case of plants such as corn when the plants are relatively small, for example one to two inches in height, and especially when the soil is relatively rough and not in small pieces.

Further, in conventional mounting of shovels and blades on plows and cultivators the bolts soon become badly rusted and rust forms between parts of the sockets and holding elements of the blades to "freeze" the latter and make removal extremely difficult.

It is a further important object and accomplishment of my invention to provide relatively thin supporting standards on plows and cultivators and novel means for securely and quickly removably mounting blades and shovels therein and which shanks and novel mounting means are of a relatively small size which will not cause throwing and deflecting of soil upon the plants during rapid or slow plowing or cultivation, and which novel mounting means permits quick and easy removal of shovels and blades.

A further object is the provision of blades having diverging edge portions partially defining holes or recesses and which removably and rigidly seat in grooves formed on opposite sides of supporting standards and in providing lever means adapted to be manually tightened for mounting the blades in secured positions.

Other and further important objects of my invention will be apparent from the following descriptions and appended claims.

In the drawings:

FIG. 3 is an exploded view thereof showing the respective parts thereof separated, and with portions of the standard broken away.

Figure 1:
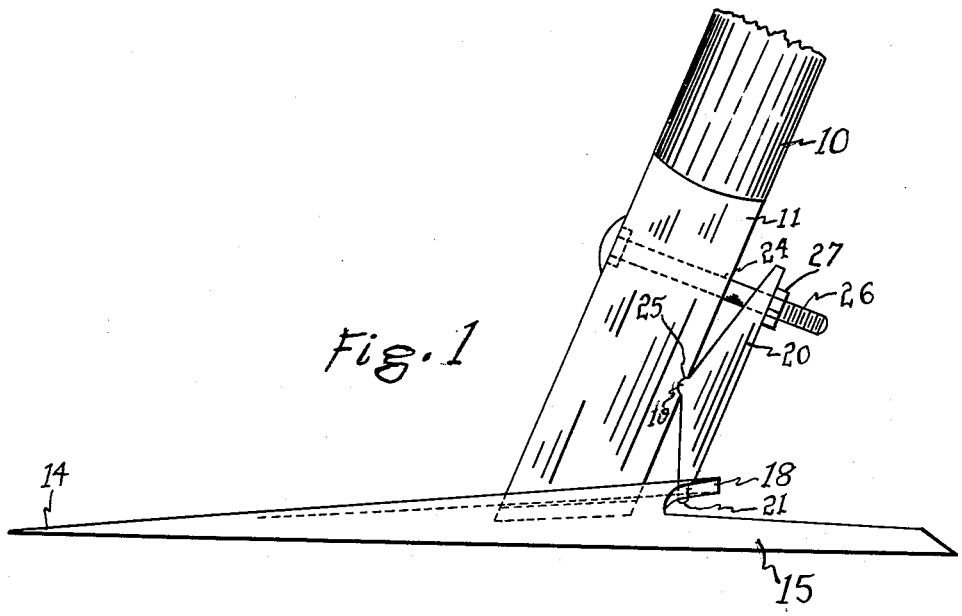
FIG. 1 is a side elevational view of my novel blade and mounting means therefor, with parts broken away.
Figure 2:
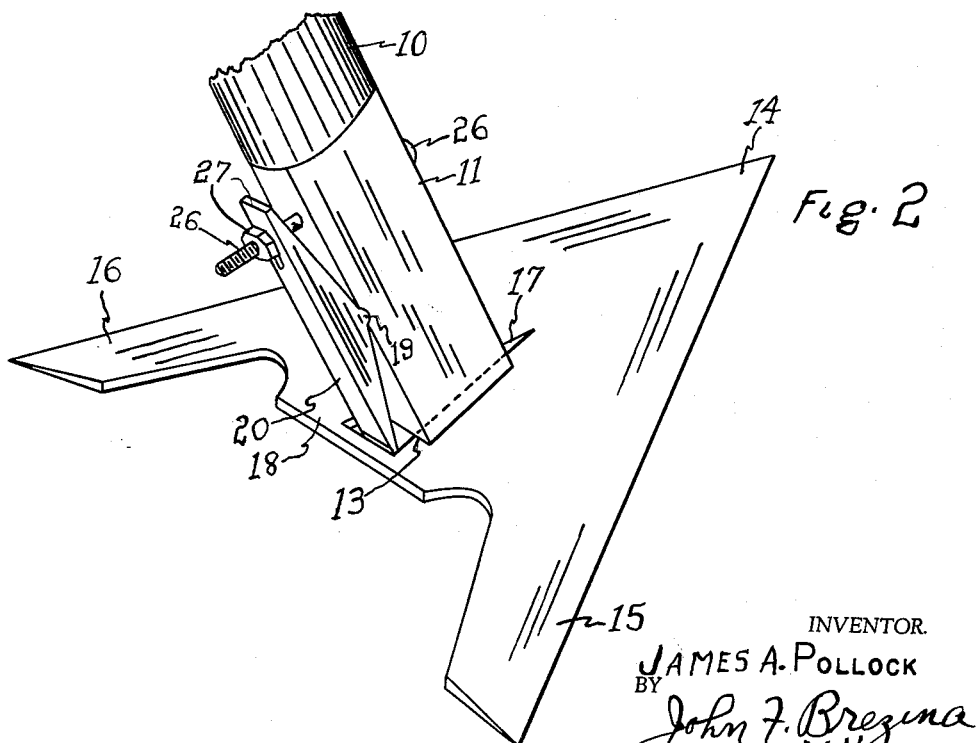
FIG. 2 is a perspective view thereof with parts broken away.

Reference numeral 10 designates a part of an adjustably mounted standard which is one of a plurality thereof (for example, four) extending downwardly and mounted on suitable manually adjustable suspension means (not shown) of a cultivator or plow, such suspension means being manually adjustable to provide for selective lowering of the sweeps or blades into the soil. The lower portion or shank 11 is formed integral with standard 10 and is reduced and preferably narrower and of square cross section as illustrated.

Formed inward of the lower end of metal shank 11 are two side opening grooves 12 and 13, the innermost faces whereof are beveled and gradually shallower and diverging outwardly toward the normally rear edge of shank 11.

Numeral 14 designates the forward apex of a metal blade, sweep or shovel which is of curved or arcuate transverse cross section and which has a pair of integral rearwardly and outwardly diverging wings or blade sections 15 and 16 whose forward edges are suitably sharpened to facilitate their movement into the soil. Said wings 15 and 16 are inclined gradually upwardly toward the middle portion thereof so as to push a part of the soil outwardly and upwardly. Said blade or sweep has an integral rearwardly extending middle portion 18 in which is formed, by the cutting or punching, a substantially triangular opening 17 having its apex extending forwardly toward apex 14 and having its base extending transversely a short distance inward from ther ear edge of the blade. Said opening 17 is of a size greater than the end of the shank 11, to permit said shank to receive the blade opening and permit the end portion of the shank 11 to extend therethrough.

Numeral 20 is a metal lever gradually reduced and beveled toward its opposite ends as indicated in the drawings, and which preferably has an integral boss or lip 19 formed on its arcuate face in a position closer to the normally lower end 21 of said lever 20. Formed in the normally lower end 21 of said lever is a transversely extending rearwardly opening groove 22.

The upper portion of lever 20 has an elongated slot formed longitudinally therein.

Shank 11 has a hole or passage 24 formed therein extending from its front to its rear face as shown in FIG. 3, and which is preferably of square shape adjacent the forward face of said shank.

When it is desired to mount one of my novel sweeps or blades on slotted shanks such as described the blade is slipped on the shank to align the two inner edges defining the passage 17 with the grooves 12 and 13, and then manually pressing the blade rearwardly to seat the inner blade edges tightly into the two grooves 12 and 13 respectively. In such position, the rear portion of the triangular passage 17 will be positioned rearwardly of the rear edge of the shank. Thereupon the lower end portion of lever 20 is inserted into such opening and the boss 19 is positioned against the recess 25 in shank 11 and a bolt 26, which is preferably a square shank carriage bolt, is inserted through passage 24 and through slot 23 and nut 27 is securely threaded thereon to cause the lever 20 to fulcrum on the boss 19 and pull the blade rearwardly to its rearmost secured position in which it is tightly held.

Said inclined grooves 12 and 13 are preferably of a size and width slightly greater than the thickness of the blade 20 adjacent said opening 17 so that a relatively snug fit results when the blade is mounted so that the blade will not pivot upwardly or downwardly as it engages the soil and other obstructions such as rocks, roots, etc., and so that the proper angular position of said blade will be maintained.

When it is desired to remove such blade for purposes of replacement, repair or sharpening, the bolt 26 is released, and the blade is manually driven or pushed in a forward direction and disengaged and removed from the end of the shank 11. An important and novel advantage is the elimination of pushing and throwing of dirt upon small plants which normally causes the plants to die, this advantage being accomplished by the relatively thinner and small size of the blade supporting shank and of the herein described means of mounting the blades.

My invention provides the many advantages hereinbefore recited, including the novel mounting means described which rigidly secures and maintains the sweeps or blades in proper positions and provides for relatively quick and easy removal and replacement.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In combination, an adjustable depending standard of a plow;

said standard having a pair of non-parallel grooves on opposite sides of its lower end portion;

a soil-working blade having rearwardly and outwardly extending integral wing sections and having a connecting middle portion;

said middle portion of said blade having a substantially triangular opening therein with its apex extending forwardly;

said blade middle portion being rearwardly mountable on said standard by mounting the same in said grooves respectively;

a lever fulcrumed on the rear portions of said standard and having at its upper end a through passage and having its lower end portion mounted in the rear portion of said opening;

said lever having a pivoting boss intermediate its ends normally engaging the rear portion of said standard and having a transverse groove at its lower end portion to engage an inner edge portion of said blade which partially defines said triangular opening;

and adjustable bolt means extending through the passage of said lever and connected to said standard to normally hold said blade in seated and mounted position on said standard.

2. In combination with an adjustably mounted and suspended standard of a plow;

the lower end of said standard having a pair of side opening converging grooves on opposite sides thereof;

a soil-working blade having outwardly extending side sections and having a substantially triangular opening with its base edge extending rearwardly;

said blade being removably mountable on the lower end of said standard by seating its edges defining the sides of said triangular opening into said grooves respectively;

lever means fulcrummed on the rear portion of said standard and extending into the base of said triangular opening;

said lever means having a transverse recess on its lower end portion in which an edge of said blade seats;

and releasable means for pivoting said lever to hold said blade in seated rearmost position relative to said standard, said lever including a bolt extending through said lever and anchored to said standard.

References Cited in the file of this patent

UNITED STATES PATENTS

| 1,073,984 | Hartig | Sept. 23, 1913 |
| 1,232,139 | Westbrooks | July 3, 1917 |

FOREIGN PATENTS

| 12,522 | Great Britain | June 2, 1902 |